Oct. 7, 1969  C. G. B. BERGLING ET AL  3,471,002
ROLLER CONVEYOR
Filed April 19, 1967  2 Sheets-Sheet 1
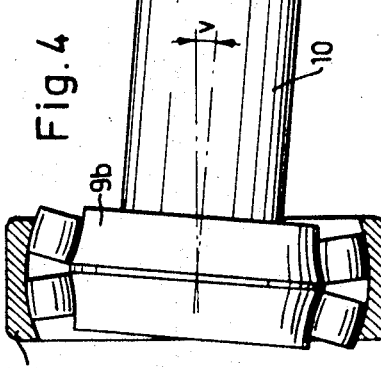
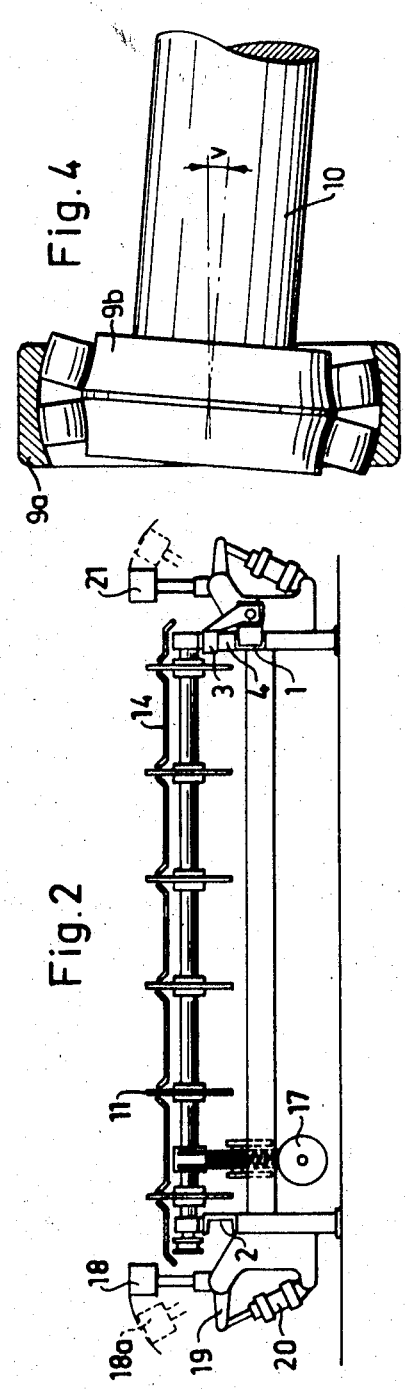
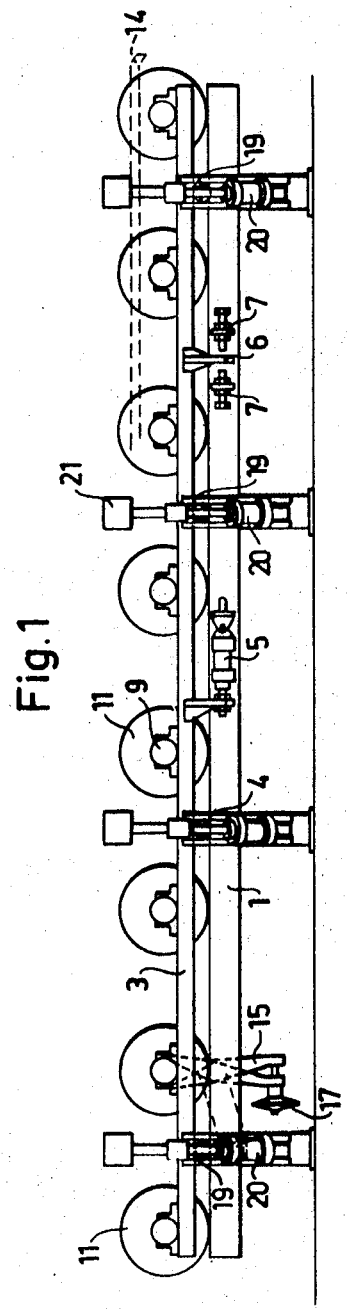

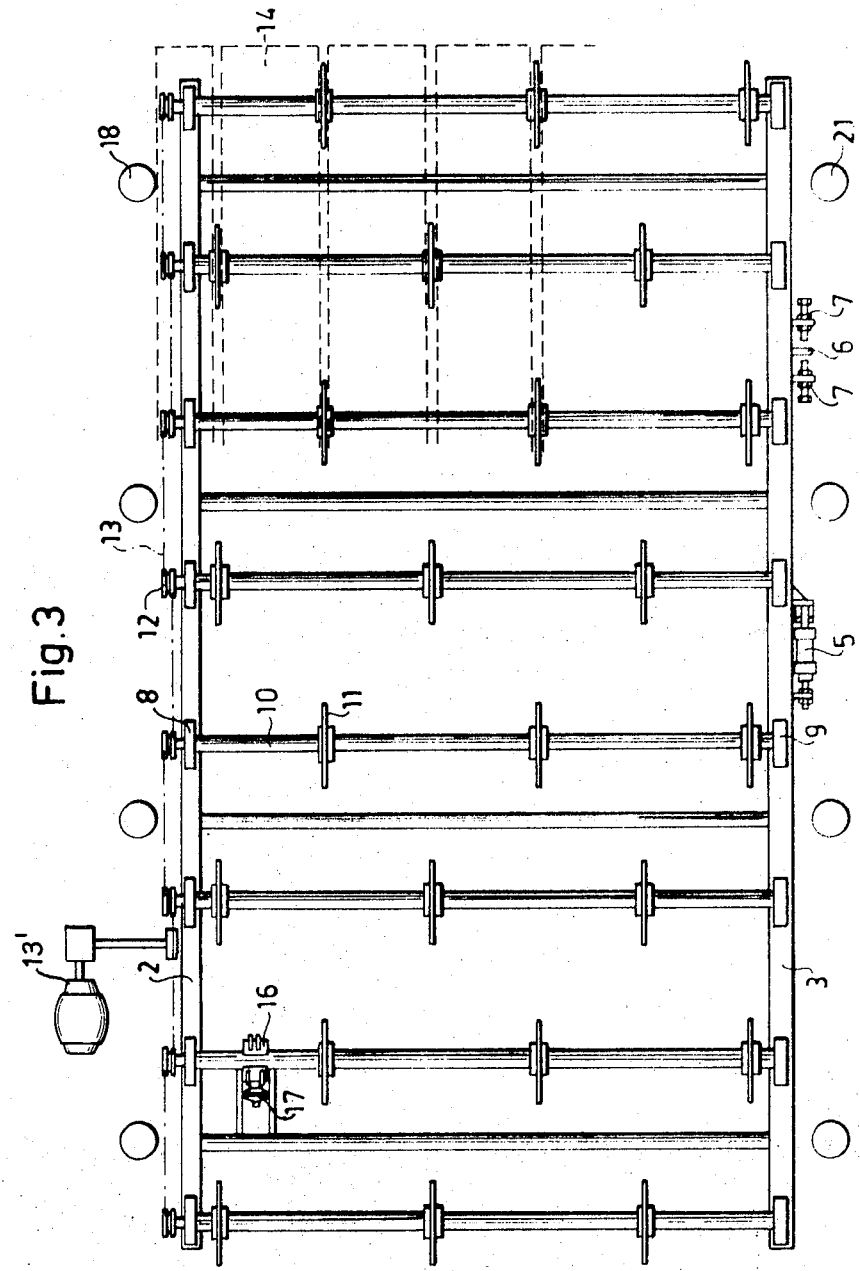

United States Patent Office 3,471,002
Patented Oct. 7, 1969

3,471,002
ROLLER CONVEYOR
Charles Gunnar Birger Bergling and Nils Herman Levin, Orebro, Sweden, assignors to Ingenjorsfirma Hebe AB, Orebro, Sweden, a Swedish company
Filed Apr. 19, 1967, Ser. No. 632,044
Int. Cl. B65g 13/02, 15/62
U.S. Cl. 198—127                                                3 Claims

ABSTRACT OF THE DISCLOSURE

The invention is concerned with a roller conveyor for metal sheets and similar articles. The rollers are mounted on shafts, and the orientation of said shafts can be varied, for moving the sheets towards one side of the conveyor. Said side of the conveyor is provided with rollers having a vertical axis, thus defining the position of the side edge of the sheets.

---

The invention is concerned with a roller conveyor, particularly a conveyor for sheet metal. It is the main object of the invention to provide a roller conveyor on which metal sheets can be transported having one longitudinal edge situated in a well defined position. The roller conveyor should preferably be used in combination with a cutting machine for sheet metal for ship building, since it is essential that the sheet metal is in a well defined position during the cutting operation.

The roller conveyor of the invention is characterized in that the axes of rotation of the rollers can be turned in the horizontal plane, and that at least one side of the conveyor contains side rollers having a vertical axis.

One end of the rotational shafts of all rollers should preferably be supported by a common beam which can be moved in its longitudinal direction, thus producing an angular movement of said roller shafts. Consequently, it is necessary that the bearings of the roller shafts are movable relative to the beam by an angle corresponding to the desired angular displacement of the roller shafts. For instance, the entire bearing may be mounted on the beam in a way allowing it to turn on the beam by the desired angle. Alternatively, both ends of the roller shafts may be supported by spherical bearings having outer annular bodies which cannot be angularly displaced. Consequently, an angular displacement of the roller shafts results in the inner angular body of the bearings being angularly displaced relative to the outer annular body. An angular displacement of the rollers by 0.3–0.5° is usually sufficient, and a spherical ball bearing or roller bearing usually permits an angular displacement of 1–2° between the inner and outer annular bodies.

The conveyor rollers may have a cylindrical shape. If the conveyor is to be used in combination with a cutting machine the rollers should preferably consist of cast iron disks, which are not damaged if a cutting flame should pass over them.

The invention will now be explained with reference to the accompanying drawings which illustrate a roller conveyor to be used in combination with a gas cutting machine for sheet metal for the construction of ships. FIGS. 1 and 2 represent two elevational views, FIG. 3 illustrates the machine as seen from above, and FIG. 4 illustrates a cross sectional view of a spherical ball bearing for the conveyor roller shafts.

The illustrated apparatus contains a framework 1 which supports two longitudinal beams 2 and 3. The beam 3 is supported on rollers 4 and can be moved in its longitudinal direction by means of a hydraulic cylinder 5 mounted on the framework 1. The beam 3 supports a stop member 6 which engages set screws 7, said set screws 7 thus defining the end positions of the movable beam 3.

The beams 2 and 3 support bearings 8, 9 for shafts 10 which are provided with disk-shaped cast iron rollers 11. The shafts 10 are rotated by electric motor means, generally indicated at 13', FIG. 3, via chains 13 and chain wheels 12. A floor is provided above the shafts 10, said floor consisting of plates 14 spaced apart so as to allow the upper portion of the rollers 11 to project between two adjacent plates. One of the shafts 10 is provided with a brake consisting of a pair of brake shoes 16 and a pair of brake levers 15 being operated by switch-controlled hydraulic bellows 17.

Both sides of the roller conveyor contain side rollers 18, 21 having a vertical shaft. The side rollers are mounted on one end of arms 19. The other end of the arms 19 is connected to a hydraulic cylinder 20. The rollers 18 can thus be moved into the position 18a.

The bearings 8, 9 are spherical ball bearings consisting of an outer annular body 9a, see FIG. 4, which is rigidly fastened to the beams 2, 3, and an inner annular body 9b which is fastened to one end of a shaft 10. As illustrated by FIG. 4 the shaft 10 and the inner angular body 9b can be angularly displaced by an angle V relative to the outer annular body 9a.

When a metal sheet is transported on the conveyor its longitudinal edge can be brought into engagement with the edge rollers 18 or 21, dependent on how the shafts 10 are displaced, said displacement being defined by the set screws 7. Consequently, the position of said longitudinal edge of the metal sheet is well defined by the side rollers 18 or 21. When the metal sheet has reached its desired position the movement of the conveyor is interrupted and the brake 16 is switched on. The edge rollers 18 or 21 are now moved into the position illustrated by reference character 18a. The entire metal sheet is now easily accessible, and can be cut in a conventional way. The cut pieces can be removed either by starting the conveyor or lifting them from the conveyor, for instance by magnetic lifting means.

What is claimed is:
1. A roller conveyor for metal sheets, which comprises a generally horizontal frame;
   two spaced longitudinal beams one of said beams being movably supported on a roller mounted on said frame;
   on said beams a plurality of pairs of support members for a plurality of spaced rotatable shafts parallel to each other, said support members being spherical bearings, having their outer annular bodies rigidly mounted on said beams;
   electric motor means for rotating said shafts in said support members;
   disk-like rollers secured on said shafts for supporting and advancing a metal sheet reposing thereon;
   on at least one side of the conveyor a plurality of side rollers mounted on normally vertical shafts; and
   means, mounted on said frame, for moving one of said beams in its longitudinal direction and thereby angularly displacing the roller shafts resulting in biasing said conveyor.

2. A roller conveyor as defined in claim 1, further comprising means for biasing said vertical shafts laterally beyond their normal position.

3. A roller conveyor as defined in claim 1, for the transport of sheet metal to be cut by means of a gas cutting machine, in which the disk-like rollers are formed of cast iron, and in which at least one of the roller shafts is associated with hydraulic brake means for preventing rotation of the rollers during a cutting operation.

(References on following page)

References Cited

UNITED STATES PATENTS

| | | | |
|---|---|---|---|
| 1,160,592 | 11/1915 | Goldman | 308—20 |
| 1,705,505 | 3/1929 | Spiess. | |
| 1,756,653 | 4/1930 | McArthur | 198—127 |
| 3,139,963 | 7/1964 | Nadler et al. | 193—37 |
| 3,151,551 | 10/1964 | Dutro et al. | 193—37 X |
| 3,176,828 | 4/1965 | Sullivan | 198—127 |
| 3,345,850 | 10/1967 | Sack et al. | 193—37 X |

OTHER REFERENCES

German allowed application, No. 1,208,241, Dec. 30, 1965, Faudt.

RICHARD E. AEGERTER, Primary Examiner

U.S. Cl. X.R.

198—202